US009252990B1

(12) United States Patent
Zhan et al.

(10) Patent No.: US 9,252,990 B1
(45) Date of Patent: Feb. 2, 2016

(54) MIMO SPHERE DECODER WITH LINEAR STARTUP IN A WIRELESS LOCAL AREA NETWORK

(71) Applicant: Quantenna Communications, Inc., Fremont, CA (US)

(72) Inventors: Pengcheng Zhan, San Jose, CA (US); Hossein Dehghan, Danville, CA (US); Hongping Liu, Milpitas, CA (US)

(73) Assignee: Quantenna Communications Inc., Fremont, CA (US)

( * ) Notice: Subject to any disclaimer, the term of this patent is extended or adjusted under 35 U.S.C. 154(b) by 586 days.

(21) Appl. No.: 13/652,376

(22) Filed: Oct. 15, 2012

Related U.S. Application Data

(60) Provisional application No. 61/546,866, filed on Oct. 13, 2011.

(51) Int. Cl.
*H04L 25/03* (2006.01)
*H04L 1/06* (2006.01)

(52) U.S. Cl.
CPC .... *H04L 25/03242* (2013.01); *H04L 25/03229* (2013.01); *H04L 1/0656* (2013.01)

(58) Field of Classification Search
CPC .. H04B 7/0417; H04B 7/0413; H04B 7/0632; H04B 7/0854; H04B 7/0639; H04B 7/0691; H04B 7/0697; H04L 2025/03426; H04L 1/0618; H04L 5/0023; H04L 25/0204; H04L 1/0026

See application file for complete search history.

(56) References Cited

U.S. PATENT DOCUMENTS

| 2004/0001564 | A1* | 1/2004 | Chan et al. | 375/341 |
| 2004/0047438 | A1* | 3/2004 | Zhuang et al. | 375/340 |
| 2005/0152484 | A1* | 7/2005 | Sandhu et al. | 375/347 |
| 2006/0268963 | A1* | 11/2006 | Yoshida | 375/148 |
| 2010/0067596 | A1* | 3/2010 | Park et al. | 375/262 |

OTHER PUBLICATIONS

U.S. Appl. No. 13/506,457, filed Apr. 19, 2012, Inventors: H. Dehghan et al. Title: Mixed-Mode MIMO Detector in a Local Area Network.

* cited by examiner

*Primary Examiner* — Un C Cho
*Assistant Examiner* — Oussama Roudani
(74) *Attorney, Agent, or Firm* — IP Creators Charles C. Cary

(57) ABSTRACT

A wireless device with multiple antennae and configured to support orthogonal frequency-division multiplexed (OFDM), multiple-input multiple-output (MIMO) communications of a wireless local area network (LAN) over a wireless communication medium on a communication channel. The wireless device comprises: a MIMO demapper configured to receive a packet on the communication channel and to perform both linear together with non-linear decoding processes based on an initial communication channel estimate 'H', and with initial linear decoding of at least a first received symbol in a payload portion of the received packet followed by decoding of remaining symbols in the packet using non-linear sphere decoding, thereby reducing a level of complexity associated with non-linear decoding by extending a time interval available for an initial channel estimate decomposition portion of non-linear sphere decoding to span at least a portion of a n interval associated with linear decoding of at least the first received payload symbol.

2 Claims, 7 Drawing Sheets

Sphere Decoding with Linear Initialization

FIG. 2

FIG. 3A  Packet

FIG. 3B  Decode Timing

FIG. 4  Wi-Fi Node: with MIMO Sphere Decoder with Linear Startup

FIG. 5

Wi-Fi Node: with MIMO Sphere Decoder with Linear Startup

FIG. 6A  FIG. 6B  FIG. 6C  FIG. 6D

FIG. 7  Sphere Decoding with Linear Initialization

MIMO SPHERE DECODER WITH LINEAR STARTUP IN A WIRELESS LOCAL AREA NETWORK

CROSS REFERENCE TO RELATED APPLICATION

This application claims the benefit of prior filed Provisional Applications No. 61/546,866 filed on Oct. 13, 2011 entitled "Efficient Maximum Likelihood MIMO Decoders" which is incorporated herein by reference in its entirety as if fully set forth herein.

BACKGROUND OF THE INVENTION

1. Field of Invention

The field of the present invention relates in general to Wi-Fi wireless access points (WAP), stations and devices for use on wireless local area networks (WLAN).

2. Description of the Related Art

Wireless local area networks (WLAN) such as home or office networks are increasingly set up and serviced using a device called a Wireless Access Point (WAP). The WAP couples all the devices of the WLAN. e.g. computers, printers, televisions to one another and to the Cable or Subscriber Line through which Internet, video, and television is delivered to the home or business. Some devices integrate wireless transceiver capability directly, others via a separate plug-in module, and still others via an attached station. Most WAPs implement the IEEE 802.11 . . . standard which is a contention based standard for handling communications among multiple competing devices for a shared wireless communication medium. The WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use. Collisions however are not easily detected in wireless home network communications, and therefore a competing links are subject to a further refinement identified as Collision Avoidance, in one form of which a link sends a request over the wireless medium which only elevates to actual data transmission if clearance to send is received from the target device. Thus the contention based protocol for wireless home networks is identified as Collision Sense Multiple Access/Collision Avoidance (CSMA/CA).

Typically wireless LAN employ the a multi-tone modulation protocol known as orthogonal frequency division multiplexing (OFDM) in which multiple communication sub-channels or tones are used to transmit data. Typically, each tone has the same constellation or modulation protocol as every other tone.

To improve bandwidth a wireless device such as a WAP or station may be equipped with multiple antennas and accompanying functionality for Multiple-input and Multiple-output, or MIMO communication links. MIMO uses multiple antennas at both the transmitter and receiver to improve communication performance, via either spatial multiplexing of multiple communication streams or diversity of a single stream. MIMO is an important pan of modem wireless communication standards for homes such as IEEE 802.11n. Further optimization of transmissions from multiple antennae may be achieved with beam forming. Optimization includes performing matrix operations on transmitted data from each antenna to compensate for variations in the channel between each source antenna on the WAP and a corresponding target antenna on the target wireless device or station.

What is needed in WLAN transceivers, e.g. WAPs, stations and devices is improved capability for MIMO reception.

SUMMARY OF THE INVENTION

The present invention provides a method and apparatus for a wireless device with multiple antennae and configured to support orthogonal frequency-division multiplexed (OFDM), multiple-input multiple-output (MIMO) communications of a wireless local area network (WLAN) over a wireless communication medium on a communication channel. The wireless device comprises: a MIMO demapper configured to receive a packet on the communication channel and to perform both linear together with non-linear decoding processes based on an initial communication channel estimate 'H', and with initial linear decoding of at least a first received symbol in a payload portion of the received packet followed by decoding of remaining symbols in the packet using non-linear sphere decoding, thereby reducing a level of complexity associated with non-linear decoding by extending a time interval available for an initial channel estimate decomposition portion of non-linear sphere decoding to span at least a portion of a n interval associated with linear decoding of at least the first received payload symbol.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Multiple-Input Multiple-Output (MIMO) communications exploiting multiple transmit and receive antennas support highly efficient transmission of one or more communication streams. Interestingly, efficiencies increase for urban, e.g. rich scattering environments with walls, floors and other obstacles as opposed to rural, e.g. line of site environments.

For a MIMO system of $M_T$ transmit antenna and $M_R$ receive antenna, the received signal per sub-channel can be expressed as:

$$y = Hx + n$$

where y is the received vector symbol. H is $M_R$ by $M_T$ channel matrix, x is the transmitted OFDM signal and n is the additive white Gaussian noise (AWGN). Typically the channel matrix is obtained using a set sequence of transmitted data in a pilot signal or preamble at the start of each communication packet, the contents of which are known to the receiving device. With both known transmit and received data the receiver initiates reception of each packet with a channel estimate H.

The transmit signal can be estimated using an MIMO detector. There are two distinct approaches to transmit signal detection, e.g. Linear decoding or Non-Linear decoding.

Linear decoding decouples the MIMO channel into a set of parallel single input channels thereby reducing receiver complexity at the cost of sub-optimal receiver performance. Weights W are determined based on the initial channel estimate for the contribution of each transmitted data stream to each receive antenna.

This detector estimates the symbol that minimizes an error metric assuming no apriori information about the transmitted bits/symbols via the following equation.

$$x = Wy$$

For zero forcing (ZF) and maximum mean square error (MMSE) MIMO detectors the equalizer MIMO estimator (W) are given as follows respectively:

$$W_{ZF} = (H^H H)^{-1} H^H$$

$$W_{MMSE} = \left( H^H H + \frac{E_s}{N_o} I_M \right)^{-1} H^H$$

where $H^H$ is the hermetian of the channel matrix, $E_s/N_o$ is the signal to noise ratio for each receive antenna and $I_M$ is the identity matrix.

Non-Linear decoding offers a far more complex and better performing alternative for estimating the transmitted data. A Maximum Likelihood (ML) MIMO detector, e.g. a hard decision sphere decoder, picks the estimate of transmit signal $x^{ML}$ that minimizes the square of the difference between the received signal vector y and Hx the product of the channel estimate and the transmitted codeword as follows:

$$x^{ML} = \arg\min_{x \in Q^{M_T}} \|y - Hx\|^2$$

where $Q^{M_T}$ denotes all possible combinations of $M_T$ streams of transmitted symbols.

Channel Estimates and resulting decoding is performed for each sub-channel, a.k.a. tone. These MIMO detection methods provide varying performance with different degrees of complexity increasing with the number of bits per symbol, and the number of streams of data. The most complex non-linear decoder, i.e. the ML decoder, compares all received signal vectors y with all possible noiseless received signals corresponding to all possible transmitted signals. Soft Sphere decoding reduces the complexity of the ML search by reducing the number of transmit vectors X for consideration and by using efficient back-substitution algorithms for determining log likelihood ratios (LLR)s for candidate codewords or symbols. The number of transmit vectors X for consideration is reduced to those candidates within a fixed radius of the received signal vector Y. A further pre-requisite to an efficient tree search is the decomposition of channel matrix. The initial channel estimate H is decomposed into the product of an orthonormal matrix Q and an upper right triangular matrix R which is invertible. The QR factorization allows us to break the problem of finding points to sub-problems of finding points in each dimension. By considering in descending order from n to 1 the values for each symbol are obtained from the fixed values for previous symbols. In an optimal Tree search each level represents one transmitted stream of data. If a given branch exceeds the designed proximity to the received signal then that branch of the tree search is terminated.

There are also simplifications of the algorithms which generally come at some performance cost. For example, the k-best algorithm with K=10 is less complex than K=16 but at the cost of performance.

Figure 1A:
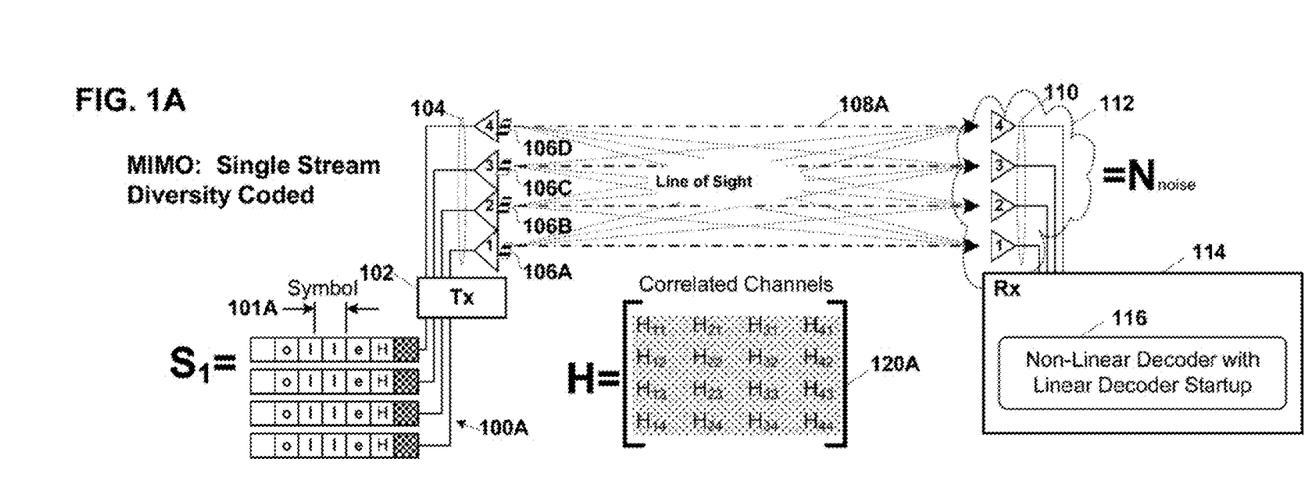
FIGS. 1A, 1B are combined hardware block and data structure diagrams of multiple-input and multiple-output (MIMO) communications exploiting diversity of a single stream and spatial multiplexing of multiple streams respectively.
Figure 1B:
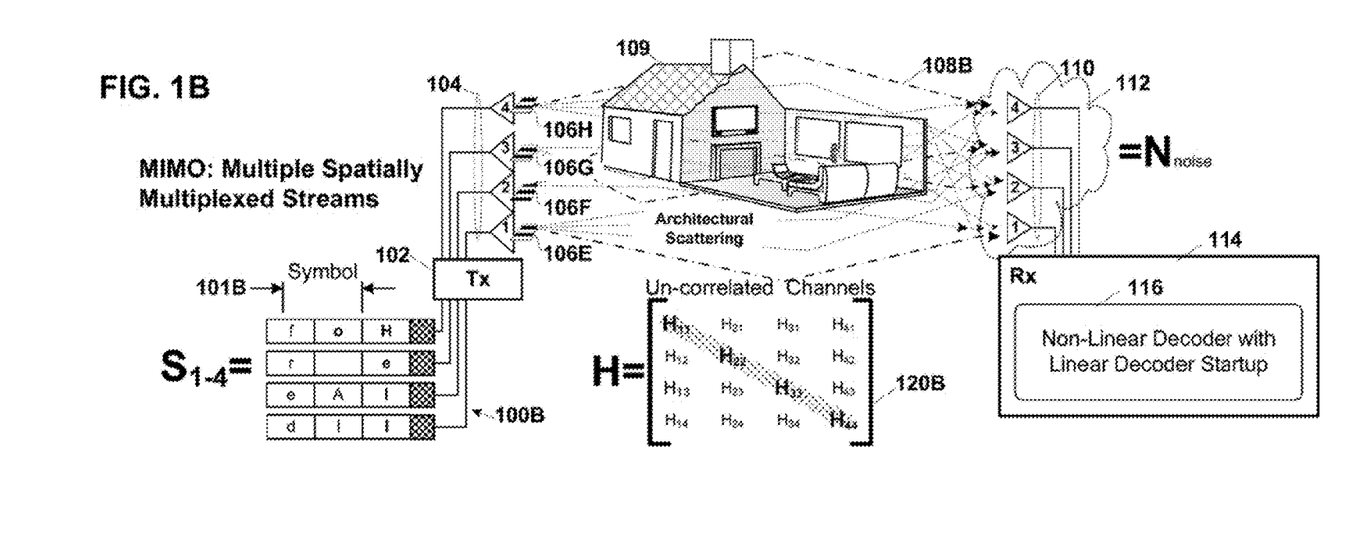

FIGS. 1A, 1B are combined hardware block and data structure diagrams of multiple-input and multiple-output (MIMO) communications exploiting diversity of a single stream and spatial multiplexing of multiple streams respectively in a wireless local area network (LAN) formed between communication devices 102 and 114. Typically communications comport with the IEEE 802.11* standard.

In FIG. 1A wireless communication devices 102 and 114 are shown. Communications are typically simplex, and in the example shown wireless communication device 102 is transmitting the same data on each of four antennae 104 to wireless communication device 114 which receives the communicated data on each of four antenna 110. In the example shown in FIG. 1A a single input data stream "$S_1$" is copied into the transmit packets 100A for redundant transmission from a corresponding one of the four antenna. Data is transmitted in symbols corresponding to a phase and or amplitude offset modulated onto the carrier signal for each sub-channel or tone. The amount of time required to transmit a symbol is identified as a symbol interval. Additionally, orthogonal frequency division multiplexing (OFDM) is used to inject the transmitted data onto contiguous tones or sub-channels each of which 106A, 106B, 106C, 106D is shown for a corresponding one of the antennae. Each antenna transmits the same data, as every other antennae with the data split between the tones or sub-channels transmitted by each antennae. Data transmitted in this redundant manner concurrently from multiple spatially separated antennae exploits the spatial diversity to improve communications.

On the wireless device 114 the received data including any noise "N" 112 introduced by the receiver components is subjected, in MIMO detector 116, to an initial or startup phase of Linear Detection followed in an embodiment of the invention by Non-linear detection, e.g. sphere decoding. In an other embodiment of the invention where as shown in FIG. 1A only a single stream is transmitted, it may be advantageous to forgo non-linear sphere decoding in favor of less computationally intensive linear decoding of each entire received packet, since in this context sphere decoding provides no additional gain. A further reduction in complexity in the QR decomposition required for sphere decoding, is achieved by initiating QR decomposition during the linear detection startup phase of decoding.

Periodically the transmitter and receiver exchange channel models "H" 120A which characterize the channel 108A between transmitter and receiver in order to adjust or improve communications there between. This channel model is a matrix the coefficients of which correspond to the differences in the transmit paths between the subject transmit and receive antennae. The dimensions of the matrix correspond to the number of transmit and receive antennae and more precisely between the number of transmit streams and the number of received antennas. Matrix H has relatively uniform coefficients which indicate a high degree or correlation between all paths, corresponding to a "line of sight" channel 108A which supports communication without intervening walls or objects.

In FIG. 1B the wireless communication devices 102, 114 have detected a communication channel 108B which has relatively high degree of scattering brought about by the walls and objects within the encompassing home or business structure. Communications are again simplex, and again exploit multiple antennae but with a significant difference in the data transmitted. The environmental scattering which might initially seem dis-advantageous is instead exploited using a second MIMO methodology identified as spatial multiplexing in which different data is sent from each antennae and further from each of the sub-channels associated therewith and the differences in each communication path from transmit to receive antennae are exploited to detect the originally transmitted data.

In the example shown wireless communication device 102 is now transmitting four different streams "$S_{1-4}$" of data on each of the four antennae 104 to wireless communication device 114 which receives the communicated data on each of four antenna 110. The different streams may be derived either from the same source or from different sources such as audio, video or data. In the example shown in FIG. 1B a single data source, is split into four unique streams which are bundled into four unique packets 100B for transmission from a corresponding one of the four antenna. Data is transmitted in symbols corresponding to a phase and or amplitude offset modulated onto the carrier signal for each sub-channel or tone. Again, orthogonal frequency division multiplexing (OFDM) is used to inject the transmitted data onto contiguous tones or sub-channels each of which 106E, 106F, 106G, 106H is shown for a corresponding one of the antennae. Each antenna transmits the unique data from each packet with the data split between the tones or sub-channels transmitted by each antenna. Data transmitted in this non-redundant manner concurrently from multiple spatially separated antennae exploits the spatial multiplexing to improve communications.

On the wireless device 114 the received data including any noise "N" 112 introduced by the receiver components is subject, in MIMO detector 116, to an initial or startup phase of Linear Detection followed by more accurate Non-linear detection, e.g. sphere decoding. A further reduction in complexity in the QR decomposition required for sphere decoding, is achieved by initiating QR decomposition during the linear detection startup phase of decoding.

Periodically the transmitter and receiver exchange channel models "H" 120B which characterize the channel 108B between transmitter and receiver in order to adjust or improve communications there between. This channel model is a matrix the coefficients of which correspond to the differences in the transmit paths between the subject transmit and receive antennae. The dimensions of the matrix correspond to the number of transmit and receive antennae. Matrix H has relatively small off diagonal coefficients and a rather prominent set of diagonal components which indicate a low degree of correlation between all paths, a.k.a. uncorrelated data paths, corresponding to an architectural environment 109 with relatively high scattering of communications of "un-correlated or scattered" channel 108B resulting from intervening walls or objects.

Figure 2:
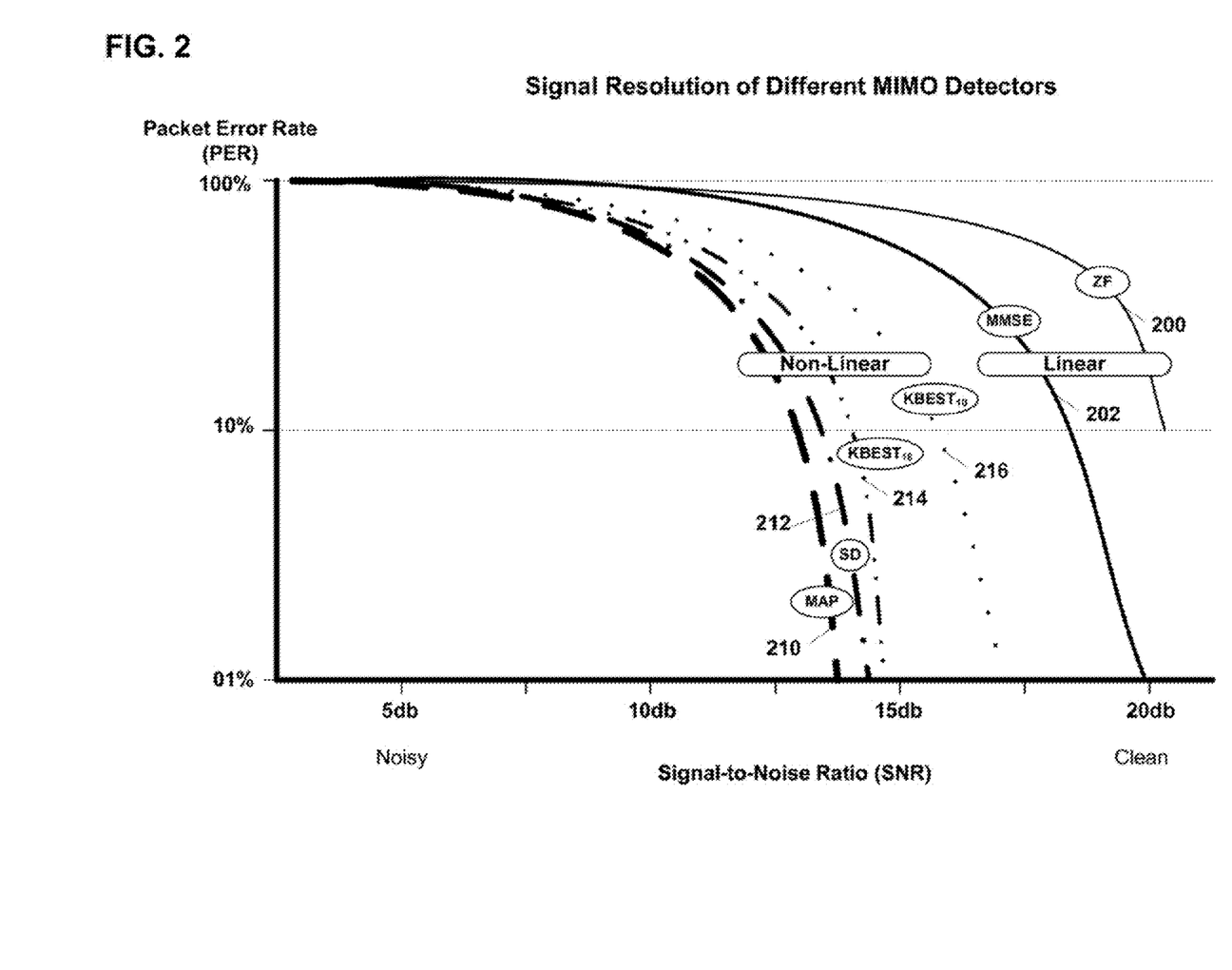
FIG. 2 is a graph showing relative signal resolution capability of representative MIMO detectors.

FIG. 2 is a graph showing relative signal resolution capability of representative MIMO detectors in terms of packet error rate (PER) on the vertical axis and signal-to-noise ratio (SNR) in decibels on the horizontal axis.

Generally the non-linear MIMO detection processes are operable at much lower SNR than the less computationally complex linear MIMO detection processes. SNR versus PER is shown for a group of linear MIMO detector processes including: zero-forcing (ZF) 200 and minimum mean-square-error (MMSE) 202.

SNR versus PER is also shown for a group of non-linear MIMO detector processes including: Maximum a posteriori probability (MAP) 210, Spherical Decoding (SD) 212, and specific optimized forms of sphere decoding such as: K-BEST$_{10}$ 216 and K-BEST$_{16}$ 214. The subscript in the case of the KBEST examples referring to the number of nodes "K" retained during the tree search. The current invention allows any of the non-linear decoding processes including those shown in FIG. 2 which require a QR decomposition or an equivalent non-iterative pre-processing step to be used with any of the linear decoding methods including those shown herein.

Generally the linear MIMO detector processes consume less resources and that minimal consumption does not vary with constellation size. Conversely, non-linear MIMO detection processes consume significantly greater resources and that consumption increases exponentially with regard to constellation size.

Figure 3A:
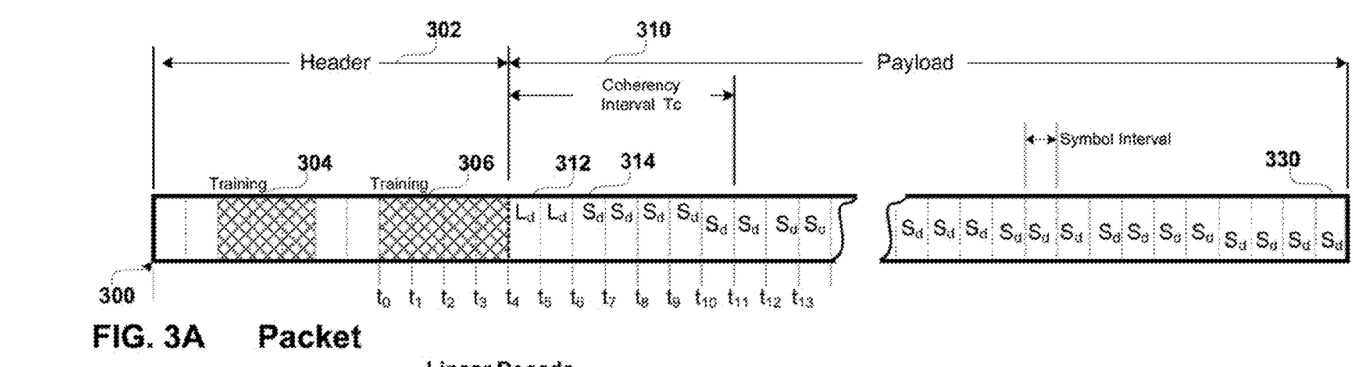
FIGS. 3A, 3B are packet structure and timing diagrams respectively showing the sequencing of MIMO non-linear decoding with a linear startup decoding phase in accordance with an embodiment of the invention.
Figure 3B:
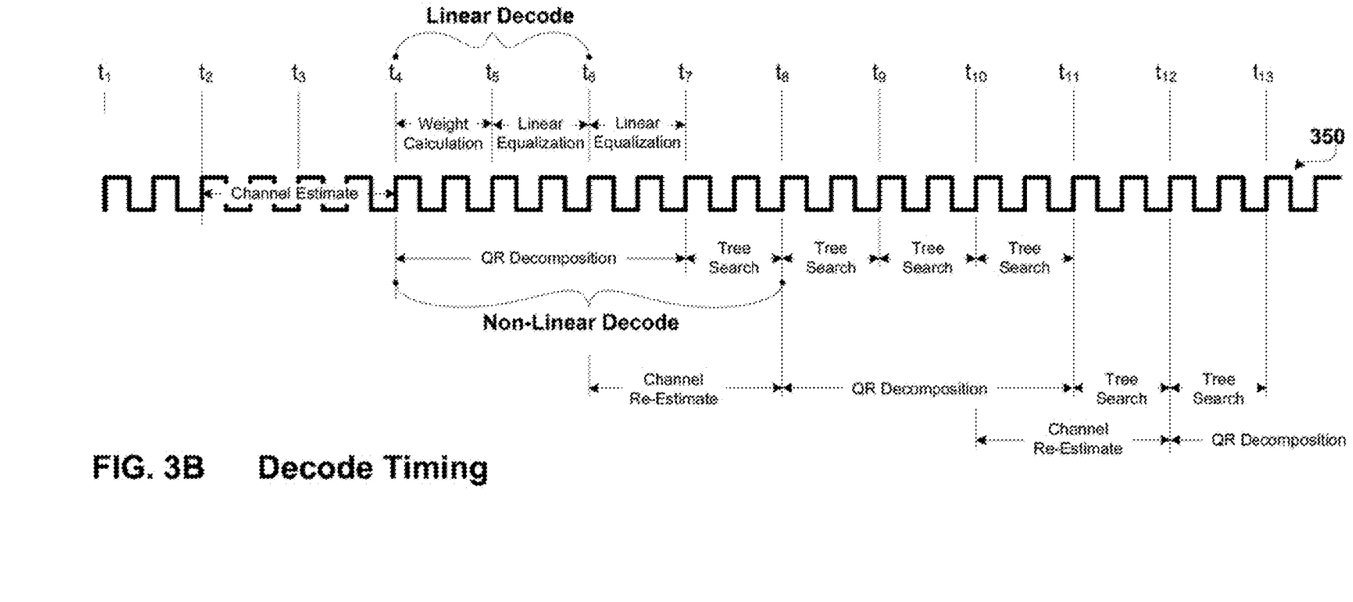

FIGS. 3A, 3B are packet structure and timing diagrams respectively showing the sequencing of MIMO non-linear decoding with a linear startup decoding phase in accordance with an embodiment of the invention.

In FIG. 3A a representative wireless packet 300 for a local area network, includes a header portion 302 containing training data 304, 306 and control information and a payload section 310 containing in some instances additional control information, such as the number of user streams, followed by user data. Data bits are transmitted as codewords each corresponding to a particular constellation and within that constellation a particular combination of phase and amplitude modulated on the carrier signal for each sub-channel or tone. Each codeword is transmitted in one symbol interval, e.g. 4 microseconds (µs). In accordance with an embodiment of the invention, initial decoding of at least the first received symbol 312 in the payload 310 is linear. After this startup decoding phase, remaining symbols in the payload. e.g. symbol 314 thru to the last symbol 330 in the packet are decoded using a non-linear sphere decoding. In another embodiment of the invention, the initial channel estimate may be revised during payload reception and decoding, with resultant channel re-estimates used to update the non-linear sphere decoding parameters. This capability is particularly important if the payload contains a large number of symbols or if the coherency interval $T_c$ over which a channel estimate is accurate is relatively short in relation to interval required to receive the payload.

FIG. 3B is a representative timing diagram 350 of both embodiments of the invention shown in FIG. 3A. The timing points of interest, $t_1$-$t_{13}$ correspond to those shown in FIG. 3A as various portions of the received packet are demodulated. An initial channel estimate H is made in the time interval $t_1$-$t_4$. This channel estimate is obtained from the training data 306 in the received packet. Next, both non-linear sphere decoding and linear decoding processes are initiated. Linear decoding involves an initial non-iterative weight calculation in which the weights required to equalize all received streams across all received antennas are determined in interval $t_4$-$t_5$, followed by a potentially iterative linear equalization in which the calculated weights are applied to at least a first received symbol 312 in the payload, e.g. in interval $t_5$-$t_6$, and in the example shown to the second symbol as well in interval $t_6$-$t_7$. During at least a portion of the interval $t_4$-$t_7$ when linear decoding is taking place, sphere decoding is initialized with the non-iterative decomposition of the channel estimate H into QR matrices. This overlap in sphere decoding with a linear decoding startup, allows the time available for QR decomposition to increase with a corresponding decrease in the complexity of associated hardware or software implemented decomposition. In the embodiment of the invention shown in FIG. 3B the initiation of linear weight calculation and QR decomposition is concurrent in time. in an alternate embodiment of the invention linear weight calculation precedes QR decomposition with the QR decomposition overlapping in time only with the subsequent linear decoding of at least the first received payload symbol. In either case, after QR decomposition is complete. subsequent decoding involves successive tree searches, associated with non-linear sphere decoding of each successive received symbol's most likely transmit data counterpart.

In accordance with a second embodiment of the invention, channel re-estimation may be used to improve the quality of the sphere decoding during receipt of the payload portion of a packet. Such re-estimation takes place over interval $t_6$-$t_8$. A subsequent of update of the QR matrices resulting from a new QR decomposition over interval $t_6$-$t_{11}$, is used to in subsequent tree searches commencing at time $t_{11}$. In still another embodiment of the invention, additional channel re-estimates, e.g. over interval $t_{10}$-$t_{12}$. and QR matrices updates, e.g. over interval $t_{12}$-$t_{15}$. may be made throughout the interval required for decoding of the entire packet.

Figure 4:
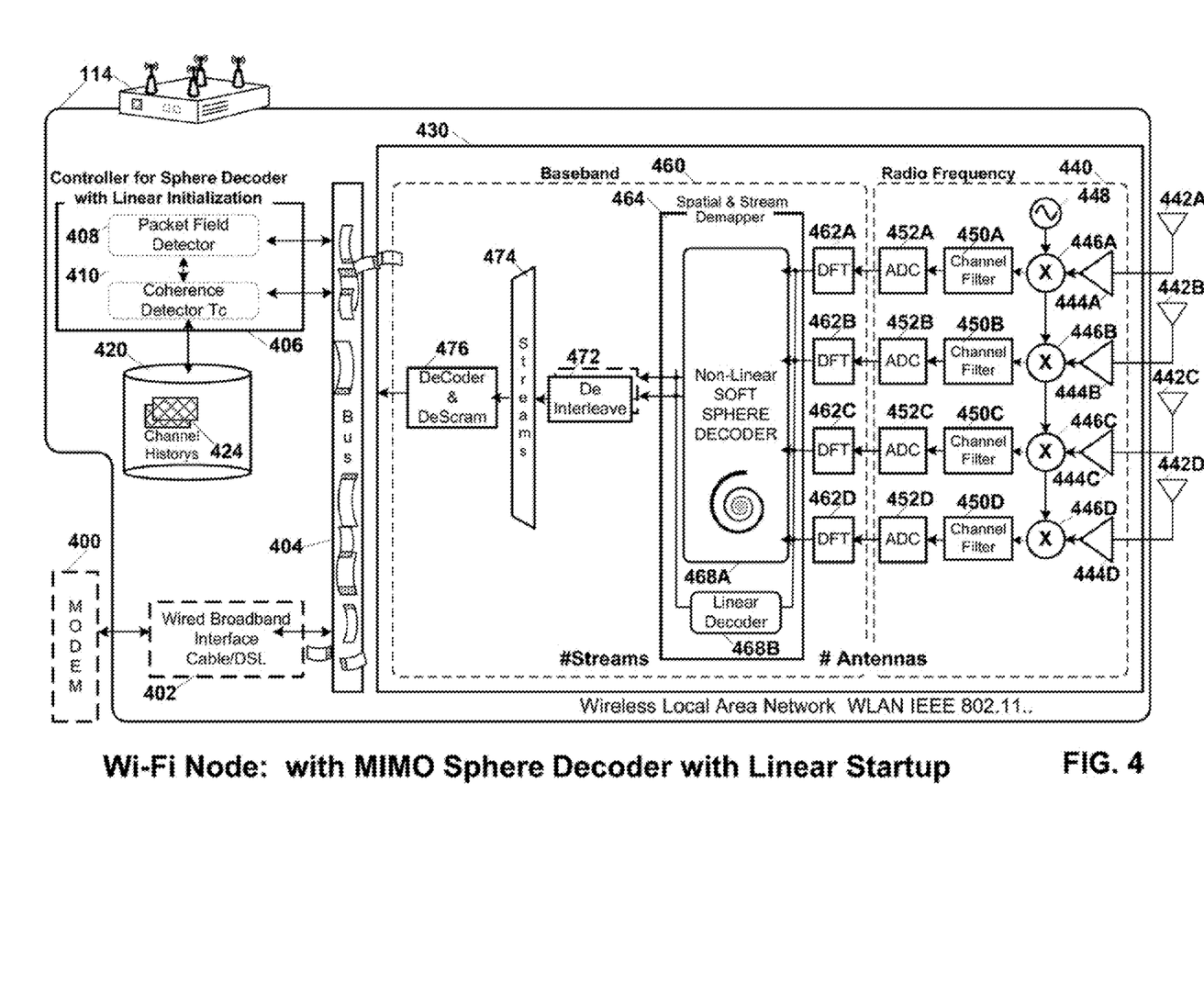
FIG. 4 is a detailed hardware block diagram of a wireless device incorporating the MIMO non-linear decoding with a linear startup of the current invention.

FIG. 4 is a detailed hardware block diagram of a wireless device 114 shown in FIG. 1 and incorporating the MIMO non-linear sphere decoding with a linear startup of the current invention.

The MIMO receive path components include antennas 442A, 442B, 442C, 442D, coupled to radio frequency (Rf) module 440 and baseband module 460 of the wireless LAN stage 430, which implements in an embodiment of the invention the IEEE 802.11* standard for WLAN, with the '*' standing for the particular sub-standard. e.g. a, b, g, n, ac.

The WLAN stage includes four discrete MIMO receive paths capable of decoding from one to four received streams. A first MIMO receive path originates with the antenna 442A, and includes: low noise amplifier (LNA) 444A, the tunable oscillator 448 and mixer 446A which down convert the received data channel, for filtration by the channel filter 450A, conversion in the analog-to-digital converter (ADC) 452A and domain conversion from the frequency to the time domain in the Discrete Fourier Transform (DFT) module 462A. The second MIMO receive path originates with the antenna 442B. and includes: low noise amplifier (LNA) 444B, the tunable oscillator 448 and mixer 446B which down convert the received data channel, for filtration by the channel filter 450B, conversion in the analog-to-digital converter (ADC) 452B and domain conversion from the frequency to the time domain in the DFT 462B. The corresponding third and fourth MIMO receive path components are labeled with the "C" and "D" suffix respectively.

In the baseband module 460 the complex coefficients for each sub-channel in each symbol interval are subject to spatial and stream demapping by the spatial and stream demapper 464. The demapper 464 includes a non-linear soft sphere decoder 468A and a linear decoder 468B. The linear decoder operates to decode at least the first received symbols after the channel estimate is complete, i.e. the at least first received payload symbols, in order to extend the time available for the initial non-iterative phase of spherical decoding, i.e. a QR decomposition of the channel estimate, to take place after which subsequent payload symbols are subject to the iterative portion of non-linear sphere decoding, i.e. the tree search to find the decoded value of the receive vector y which minimizes the square of the difference between the received signal vector y and Hx the product of the channel estimate and the transmitted symbols.

The stream and spatial demapper 464 outputs bits corresponding to each transmitted stream. These bits are deinterleaved in deinterleaver 472, multiplexed in stream multiplexer 474 and decoded and descrambled in the decoder and descrambler 476 which couples to the packet based bus 404.

The spatial and stream demapper 464 operates under control of the controller 406 for sphere decoder with linear initialization. The controller includes a packet field detector 408 and a coherence detector 410 coupled to storage 420. The packet field detector controls the timing for channel estimation. and the timing of both initial non-iterative and iterative portions of both the linear decoder 468B and the non-linear soft sphere decoder 468A. The coherence detector controls the determination of when and whether or not channel re-estimation takes place during decoding of remaining symbols within a received packet. This determination may be based on stored statistics such as past channel estimates 424 or a count of successive symbols since a prior channel estimate or re-estimate.

In an embodiment of the invention where the wireless LAN device 114 comprises a wireless access point (WAP) the device also includes a broadband interface 402 for interfacing with a modem 400.

Figure 5:
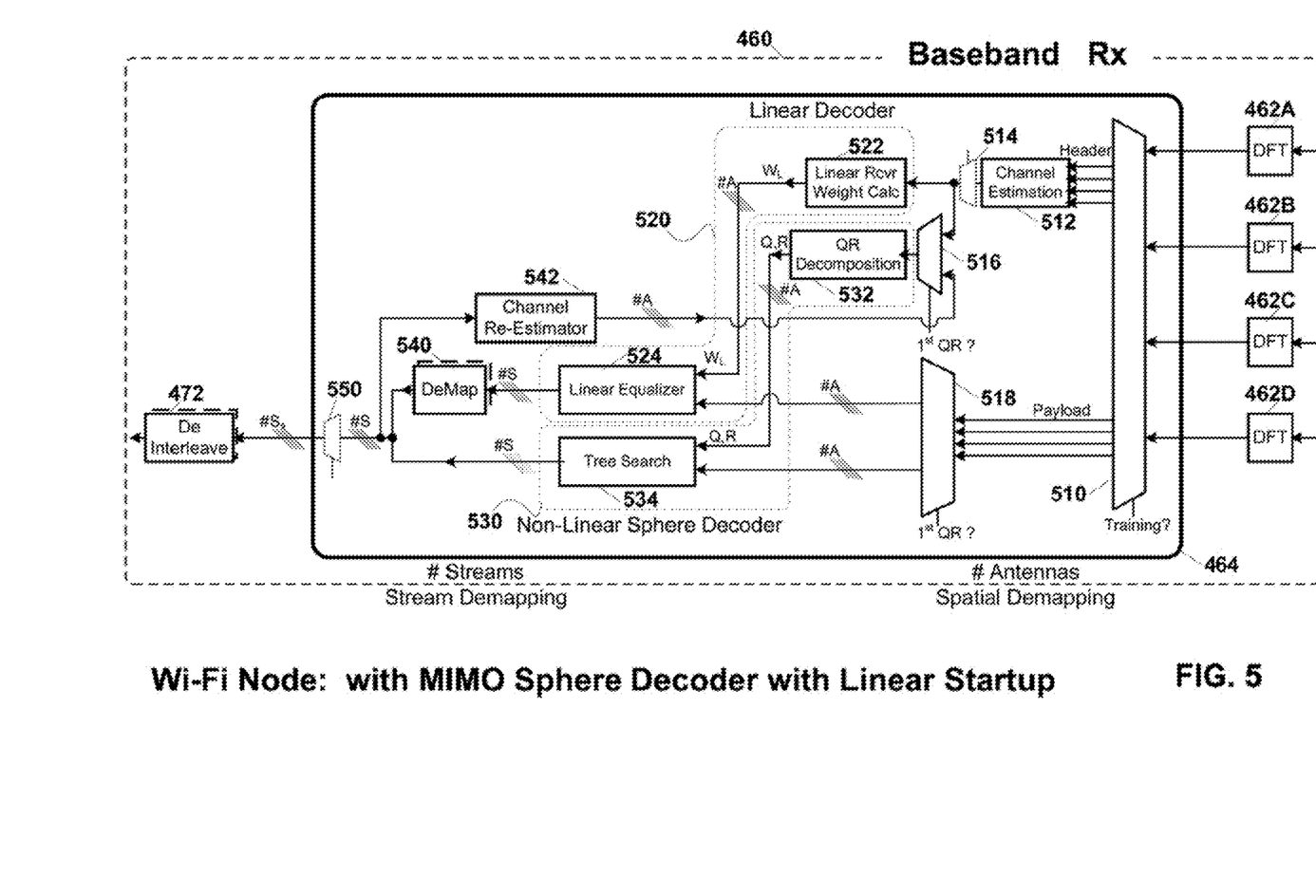
FIG. 5 is an exploded hardware block diagram of an embodiment of the spatial and stream demapper shown in FIG. 4 incorporating both non-linear sphere decoding together with linear decoding.

FIG. 5 is an exploded hardware block diagram of an embodiment of the spatial and stream demapper shown in FIG. 4 incorporating both non-linear sphere decoding together with linear decoding. After down-conversion the received signals from each antenna are converted from the frequency domain to the time domain in Discrete Fourier Transform (DFT) modules 462A-462D. In the baseband module 460 and specifically the spatial and stream demapper 464 the complex coefficients for each sub-channel in each symbol interval output by the DFT modules 462A-462D are subject to spatial and stream demapping.

The demapper 464 includes a demultiplexer 510 which switches the four antenna input paths between either a channel estimator 512 or a second demultiplexer 518. The demultiplexer 510 is reset for each received packet with initial symbols in the header portion of the packet including the training symbol(s) sent to the channel estimator 512 for initial channel estimation. After training symbols are received and the payload processing commences demultiplexer 510 switches subsequent processing for all subsequent received symbols in the packet to the demultiplexer 518.

The initial channel estimate H output by the channel estimator 512 is input to both the linear decoder 520 and via multiplexer 516 to the non-linear sphere decoder 530.

The linear decoder and specifically the weight calculation component 522 thereof, uses the channel estimate to calculate the weights required to spatially decode the received streams of at least the first received symbol in the payload using the linear equalizer component 524 of the linear decoder.

The non-linear sphere decoder 530 and specifically the QR decomposition component 532 thereof, uses the same channel estimate, in this case for a decomposition into a corresponding QR matrices for subsequent iterative non-linear sphere decoding of remaining received symbols in the payload portion of each packet by the tree search component 534 of the non linear sphere decoder 530.

After the training symbol(s) in the header of a received packet have completed transfer to the channel estimator the payload symbols are passed to demultiplexer 518. This switch as well is reset at the start of each received packet. Initially at least the first received payload symbol(s) is passed to the linear equalizer 524 for spatial demapping followed by subsequent stream demapping in demapper 540. When the initial QR decomposition in QR decomposition component 532 is complete, demultiplexer 518 switches remaining received payload symbols to the iterative part of the non-linear decoder, i.e. the tree search component 534 for spatial and stream decoding.

The spatial and stream demapped outputs of either the linear or non-linear sphere decoders is passed to the deinterleavers 472 for deinterleaving.

A feedback path from the outputs either decoder to the channel re-estimator 542 is shown. This component in an embodiment of the invention accomplishes channel re-estimation concurrently with existing decoding. Any new channel re-estimates are passed via multiplexer 516 to the QR decomposition component for decomposition. The updated QR matrices are then used in the Tree search component 534 for subsequent sphere decoding.

In an embodiment of the invention compatible with multi-user MIMO transmissions either one of optional stream switches 514 or 550 may be used for stream selection among the received streams. Switch 514 between the channel estimator and the linear and non-linear decoder modules 520 and 530 can be used to determine which columns of the channel estimate to send to the decoders. Alternately, switch 550 can select among the streams of LLR's those subject to subsequent baseband processing.

In FIG. 5 the notation #A and #S is used to indicate the bus or path width at various locations in the spatial and stream decoder 464 with #A indicating a bus width corresponding to the number of receive antennas and #S indicating a bus width corresponding to the number of received streams.

Figure 6A:
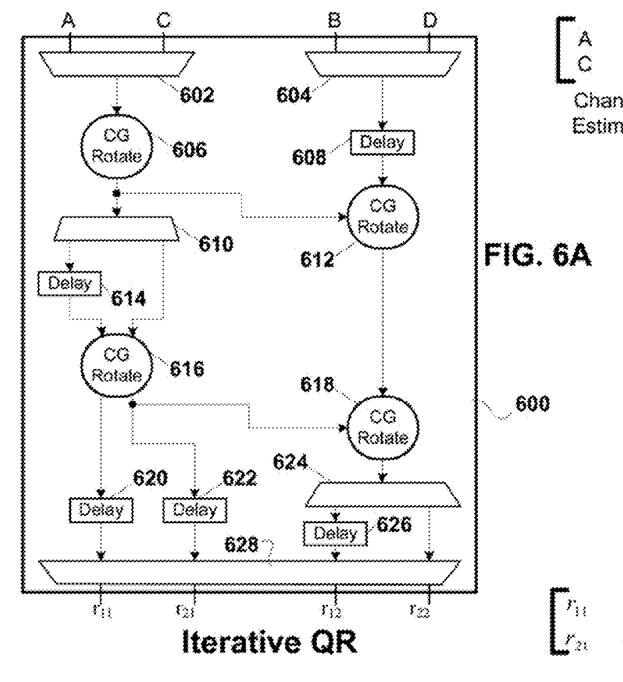
FIGS. 6A, 6B are detailed hardware block diagrams of alternate iterative and parallel architectures for the QR decomposition module shown in FIG. 5.
Figure 6B:
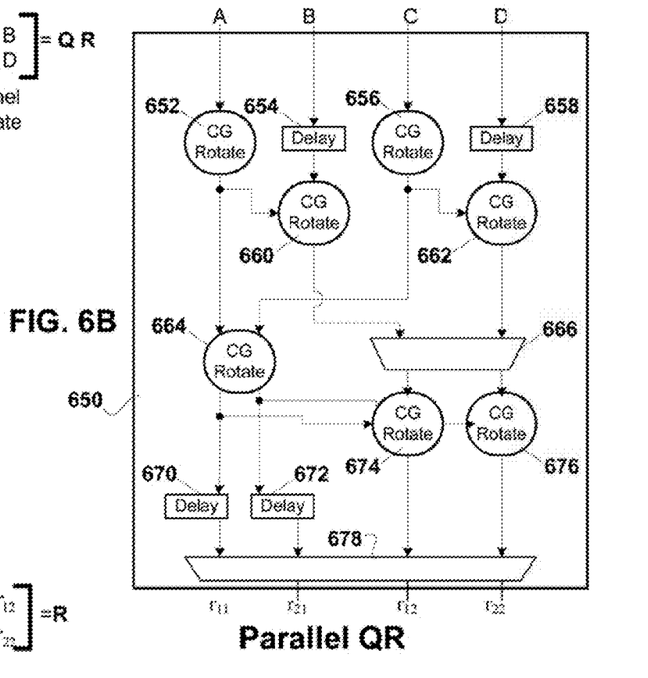

FIGS. 6A, 6B are detailed hardware block diagrams of alternate iterative and parallel architectures respectively for the QR decomposition module 532 shown in FIG. 5. There are several well known methods for performing a QR decomposition on a channel estimate, most notably: Householder reflections or Complex Givens Rotations (CGR). The QR decomposition modules 600 in FIG. 6A and 650 in FIG. 6B differ architecturally from one another. The QR decomposition module 650 exploits parallel processing to reduce the time required to perform QR decomposition.

Figure 6C:
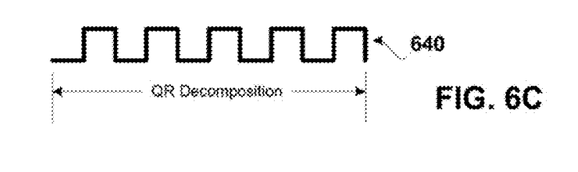
FIGS. 6C, 6D are timing diagrams showing the differences in relative time required for decomposing the channel estimate into Q and R matrices for the iterative and parallel architectures shown in FIGS. 6A, 6B respectively.
Figure 6D:
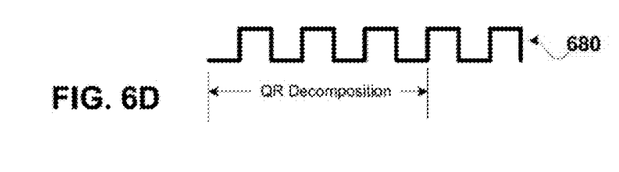

QR decomposition module 650 processes all rows and columns of the channel estimate matrix in parallel. This parallel decomposition module 650 utilizes seven CGR process blocks, 652, 656, 660, 662, 664, 674, 676 and associated delay blocks 654, 658, 670, 672 and switches 666 and 678 to perform a QR decomposition in the relatively short timespan shown in timing diagram 680 in FIG. 6D.

QR decomposition module 600 processes one row of the channel estimate matrix at a time. As a result this iterative decomposition module 600 requires fewer, i.e. four, CGR process blocks 606, 612, 616, and 618 to perform a QR decomposition along with associated delay blocks 608, 614, 620, 622 626, and switches 602, 604, 610, 626 and 628. The time required to perform a QR decomposition in this iterative decomposition module is correspondingly longer than its parallel counterpart as shown in timing diagram 640 in FIG. 6C.

The current inventions use of a linear decoder during initialization of a non-linear sphere decoder reduces the latency associated with decoding exclusively with a non-linear sphere decoder. Additionally, since QR decomposition is initiated during the linear decoder startup. the time interval available for QR decomposition is sufficiently long as to allow the sparse iterative QR decomposition architecture such as that shown in FIG. 6A to perform QR decomposition.

Figure 7:
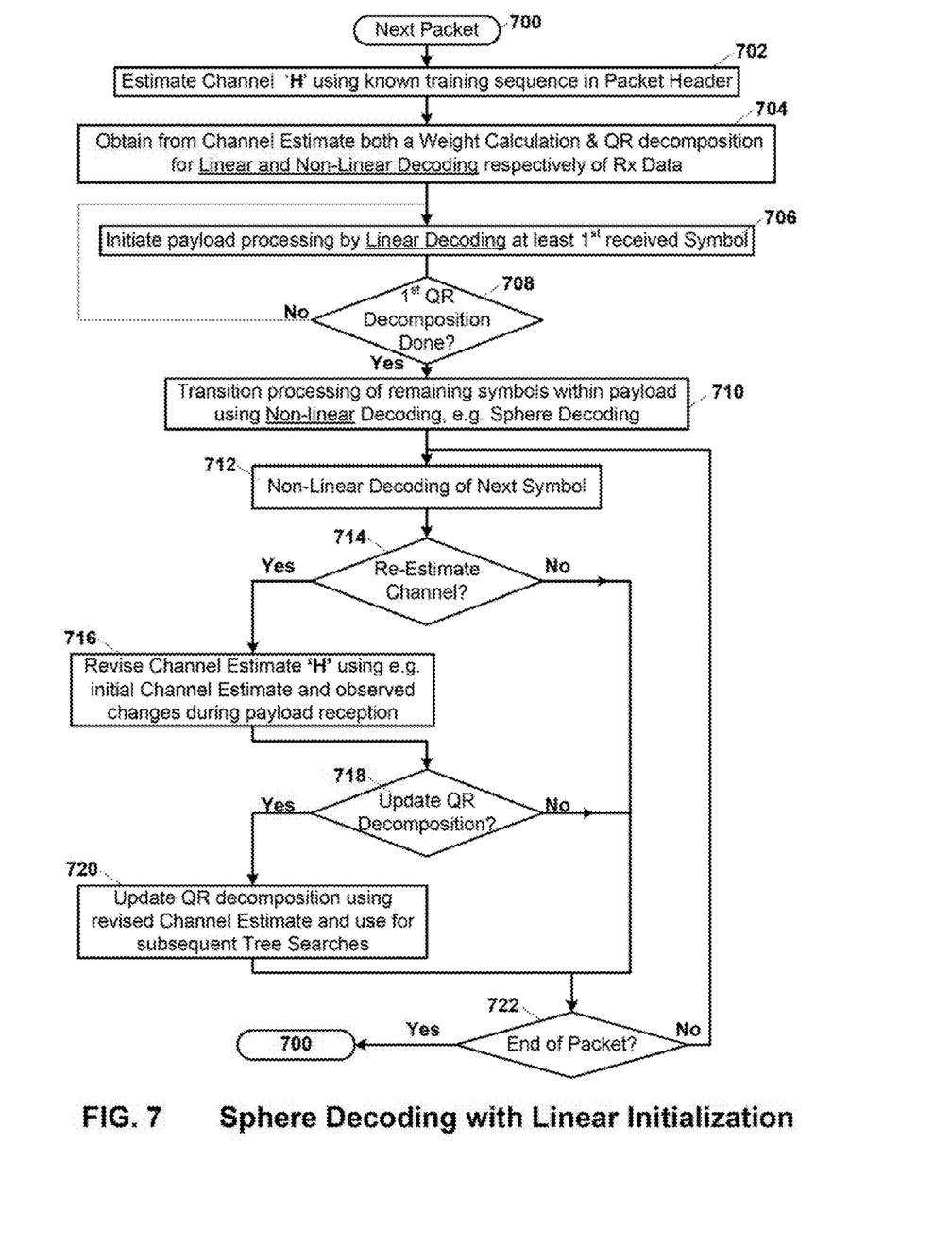
FIG. 7 is a process flow diagram of processes associated with MIMO non-linear decoding with a linear startup decoding phase in accordance with an embodiment of the current invention.

FIG. 7 is a process flow diagram of processes associated with MIMO non-linear decoding with a linear startup decoding phase in accordance with an embodiment of the current invention. In process 700 processing of the next received packet is initiated. In process 702 the known training sequence or preamble in the packet header is used to estimate the channel 'H'. The channel estimate is then used in process 704 to obtain both a weight calculation and a QR decomposition as required for linear decoding and non-linear sphere decoding respectively of received data. Next in process 706 payload processing is initiated with linear decoding of at least the first received symbol in the payload. Next in decision process 708 a determination is made as to whether the $1^{st}$ QR decomposition initiated in process 704 is completed. If the initial QR estimate is not complete control returns to process 706 for the linear decoding of the next symbol in the payload portion of the packet.

When the initial, a.k.a. $1^{st}$, QR decomposition is completed control passes to process 710 in which a transition from linear to non-linear decoding of remaining symbols in the payload of the packet is initiated. In process 712, the next symbol is decoded using non-linear sphere decoding.

Next in decision process 714 a determination is made as to whether and if so, when channel re-estimation will be implemented. If channel re-estimation is not implemented or is implemented but is not currently required, then control is passed directly to decision process 722. Alternately, if a channel re-estimate is required then control is passed to process 716 in which a channel re-estimate is made. There are different approaches to channel re-estimation. In an embodiment of the invention channel re-estimation results from incremental adjustments to the initial channel estimate obtained in process 702 and based on observed changes in the channel during decoding of successive symbols in the payload. In another embodiment of the invention channel re-estimates are based exclusively on the received data, e.g. blind equalization. After the channel re-estimate is obtained, control passes to decision process 718.

In decision process 718 a determination is made as to whether a new QR decomposition using the channel re-estimate is to be initiated. If not, control passes directly to decision process 722. Alternately, if the QR decomposition is to be updated then control passes to process 720 in which the QR decomposition of the channel re-estimate is performed. The resultant updated QR decomposition is utilized for subsequent non-linear sphere decoding and specifically tree searches for the most likely transmitted symbols. Control then passes to decision process 722. In decision process 722 an end of packet determination is made. If negative, control returns to process 712 for non-linear sphere decoding of the next symbol in the packet. Alternately, if there are no more symbols in the packet then control returns to process 700 for the processing of the next packet.

Incremental Channel Re-Estimation

The following is an example of channel re-estimation in accordance with an embodiment of the invention where:

$N_{rx}$ is the number of receive antennas:

$N_{sts}$ is the number of data streams transmitted in a packet;

$N_{ltf}$ is the number of training symbols;

k is the tone index for Fast Fourier Transform (FFT) processing;

l is the Orthogonal Frequency Division Multiplexing (OFDM) symbol index:

$\hat{H}_k(l)$ are the Channel estimates for the k-th tone and l-th OFDM symbol;

$\tilde{s}_k(l)$ is the Hard decision of the transmitted symbols for the k-th tone; and $\tilde{z}_k(l)$ is the Receive signal for the k-th tone and l-th OFDM symbol.

The MIMO receive signal model for the k-th tone is: $y_k = H_k x_k + n_k$ where $y_k$ is an $N_{rx}$-by-1 vector; $H_k$ is the effective channel matrix with $N_{rx}$-by-$N_{sts}$ dimension; $x_k$ is an $N_{sts}$-by-1 vector, and $n_k$ is an $N_{rx}$-by-1 random vector with complex Gaussian distribution. To extend the above model to capture multiple receive symbols, all the above vectors are stacked column by column into matrices with the result that: $Y_k$ is an $N_{rx}$-by-$N_s$ matrix; $X_k$ is an $N_{sts}$-by-$N_s$ vector; $N_k$ is an $N_{rx}$-by-$N_s$ random matrix; and $N_s$ is the number of symbols received.

To estimate the channel, with the model $Y_k = H_k X_k + N_k$, we have $X_k$ known during the training period. We can rewrite the above equation by transposing both sides of the equation to get: $Y_k^T = X_k^T H_k^T + N_k^T$.

Next with notations: $Z_k \equiv Y_k^T$; and $P_k \equiv X_k^T$ the least square channel estimate for $H_k^T$ is:

$$\hat{H}_k = (P_k^H P_k)^{-1} P_k^H Z_k$$

Where the symbol index has been omitted for simplicity of notation. During the training period, $P_k$ are known signals, which are used to evaluate the above equation for channel estimates. As more and more data symbols are decoded, $P_k$ will grow upon making hard decision based on LLR output of the receiver.

The following equations pertain to updating channel estimates, or to be more precise the transpose of channel estimates. During the training period, we can directly evaluate the initial channel estimates, which we denote $\hat{H}_k(0)$ by calculating the equation provided above. Specifically: $P_k(0)$ would be $N_{ltf}$-by-$N_{sts}$ known signal and $Z_k(0)$ is an $N_{ltf}$-by-$N_r$ receive signal matrix during the training period. In IEEE 802.11n/ac, the training signal is designed in such a way that:

$$(P_k^H(0)P_k(0))^{-1} = \frac{1}{N_{ltf}} I$$

where I denotes an $N_{sts}$-by-$N_{sts}$ identity matrix.

As each data symbol is decoded, $P_k(l)$ will grow in rows with one more additional row at the end of $P_k(l-1)$ with $\tilde{s}_k(l)$, which is a 1-by-N, row vector, and similarly $Z_k(l)$ is built upon $Z_k(l-1)$ by adding one extra row $\tilde{Z}_k(l)$, which is a 1-by-N. row vector.

Defining $A_k(l) \equiv (P_k^H(l)P_k(l))^{-1}$ we have the following channel estimate updates equations:

$$\alpha_k(l) \equiv \frac{1}{1 + \tilde{s}_k(l) A_k(l-1) \tilde{s}_k(l)}$$

$$A_k(l) = A_k(l-1) - \alpha_k(l) A_k(l-1) \tilde{s}_k^H(l) A_k(l-1))$$

$$\hat{H}_k(l) = (1 - \alpha_k(l) A_k(l-1) \tilde{s}_k^H(l) \tilde{s}_k(l)) \hat{H}_k(l-1) + \alpha_k(l) A_k(l-1) \tilde{s}_k^H(l) \tilde{z}_k^H(l)$$

With the above equation providing the transpose of the channel estimates, upon making hard decision at the receiver, we can obtain $\tilde{s}_k(l)$ which we can further use to refine the channel estimates.

The components and processes disclosed herein may be implemented as software. hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this an. It is intended that the scope of the invention be defined by the following claims and their equivalents.

What is claimed is:

1. A wireless device with multiple antennae and configured to support orthogonal frequency-division multiplexed (OFDM) multiple-input multiple-output (MIMO) communications of a wireless local area network (WLAN) over a wireless communication medium on a communication channel; and the wireless device comprising:

a MIMO demapper configured to receive a packet on the communication channel and to perform both linear together with non-linear decoding processes based on an initial communication channel estimate 'H', and with initial linear decoding of at least a first received symbol in a payload portion of the received packet followed by decoding of remaining symbols in the packet using non-linear sphere decoding, and the MIMO demapper having:

a linear decoder configured to perform both a non-iterative initial weight determination and a linear equalization for at least the first received symbol in the payload portion of the received packet using the initial weight determination; and a non-linear sphere decoder configured to perform a non-iterative decomposition of the initial channel estimate 'H' into unitary and upper right triangular matrices 'Q' 'R' respectively during at least a portion of a time interval associated with linear decoding of at least the first received payload symbol, followed by an iterative maximum likelihood search decoding of each remaining received symbol in the payload portion of the packet using the initial "QR" decomposition, thereby extending a time interval available for an initial channel estimate decomposition portion of non-linear sphere decoding to span at least a portion of an interval associated with linear decoding of at least the first received payload symbol.

2. A method for operating a wireless device with multiple antennae and configured to support orthogonal frequency-division multiplexed (OFDM), multiple-input multiple-output (MIMO) communications of a wireless local area network (WLAN) over a wireless communication medium on a communication channel; and the method comprising:

receiving a packet on the communication channel;

estimating the received communication channel 'H';

performing both linear together with non-linear decoding processes based on the initial communication channel estimate 'H' in the estimating act;

calculating weights for each antenna and stream based on the initial communication channel estimated in the estimating act;

linearly decoding at least a first received symbol in a payload portion of the received packet, including;

performing both a non-iterative initial weight determination and a linear equalization for at least the first received symbol in the payload portion of the received packet using the weights calculated in the calculating act;

sphere decoding remaining symbols in the packet using non-linear sphere decoding, including:

performing a non-iterative decomposition of the initial channel estimate 'H' into unitary and upper right triangular matrices 'Q' 'R' respectively during at least a portion of a time interval associated with the linear decoding of at least the first received payload symbol in the performing act; and iteratively performing a maximum likelihood search decoding of each remaining received symbol in the payload portion of the packet using the initial 'Q' 'R' matrices from the second performing act, thereby extending a time interval available for an initial channel estimate decomposition portion of non-linear sphere decoding to span at least a portion of an interval associated with linear decoding of at least the first received payload symbol in the linear decoding act.

* * * * *